United States Patent [19]

Shahidi et al.

[11] 4,035,321

[45] July 12, 1977

[54] PREPARATION OF ULTRAVIOLET CURABLE ACRYLATED POLYMERS

[75] Inventors: Iraj K. Shahidi, Florham Park; John C. Trebellas, Berkeley Heights, both of N.J.

[73] Assignee: Celanese Corporation, New York, N.Y.

[21] Appl. No.: 561,457

[22] Filed: Mar. 24, 1975

[51] Int. Cl.² ............... C08F 263/06; C08L 67/06; C08L 67/08

[52] U.S. Cl. .................. 260/22 CB; 96/115 R; 204/159.15; 204/159.16; 204/159.19; 204/159.23; 260/23 P; 260/836; 260/873; 260/901

[58] Field of Search ............ 96/115 R; 260/22 CB, 260/23 P, 836, 873, 901

[56] References Cited

U.S. PATENT DOCUMENTS

| | | | |
|---|---|---|---|
| 3,558,387 | 1/1971 | Bassemir et al. ................. | 260/23 P |
| 3,628,963 | 12/1971 | Akamatsu et al. ................. | 96/115 R |
| 3,808,114 | 4/1974 | Tsuchihara et al. ........... | 204/159.16 |
| 3,813,322 | 5/1974 | Nihchaldas .................... | 204/159.15 |
| 3,825,428 | 7/1974 | Davidson ......................... | 96/115 R |
| 3,832,187 | 8/1974 | Kleeberg et al. ................. | 96/115 R |
| 3,876,432 | 4/1975 | Carlick et al. .................... | 96/115 R |
| 3,882,187 | 5/1975 | Takiyama et al. ................ | 260/836 |
| 3,909,269 | 9/1975 | Parker et al. ...................... | 96/115 R |
| 3,919,063 | 11/1975 | Maruyama et al. ........... | 204/159.15 |
| 3,948,665 | 4/1976 | Richter et al. .................... | 96/115 R |

*Primary Examiner*—Ronald W. Griffin

[57] ABSTRACT

There is disclosed a process for conveniently preparing polymers having pendant ultraviolet polymerizable groups of the acrylate or methacrylate types, which process involves co-reacting a polymer containing the C-X moiety with a monomer having the general formula

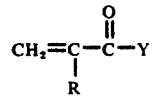

wherein X is OH or COOH and Y is OH when X is OH, and OR'OH when X is COOH, wherein R' is $C_1$-$C_6$ alkyl. This process is catalyzed utilizing an essentially solid ion exchange catalyst.

13 Claims, No Drawings

PREPARATION OF ULTRAVIOLET CURABLE ACRYLATED POLYMERS

BACKGROUND OF INVENTION

This invention pertains to ultraviolet curable coating compositions. More particularly, this invention pertains to processes for rendering normally-inert polymers curable by the use of ultraviolet radiation.

The use of ultraviolet curable coating compositions has steadily increased in recent years due to desires for conservation of energy and for reduction of polluting effluents. Ultraviolet curable coating compositions are useful in both these areas, because they (1) require little energy for curing, and (2) do not in most cases produce pollutants when cured.

Heretofore, however, most ultraviolet curable compositions have been based upon essentially monomeric materials. The incorporation of acrylate unsaturation onto polymeric backbones by direct esterification between, for example, acrylic acid and an hydroxy-containing polymer, has been difficult due to the extremely high reaction temperature required to effect the direct esterification reaction. Furthermore, direct esterification reactions using either no catalyst or traditional esterification catalysts, have required extended period of time for complete esterification. Both high reaction temperatures and extended esterification times have contributed greatly to low product yield, due in large part to polymerization which occurs during these high temperature, lengthy direct esterification processes.

In addition, where such reactions have been carried out, the degree of possible arcylation, for example, has been rather low due to inefficient acrylation. Furthermore, the catalysts utilized have been quite expensive and were generally lost after the reaction was completed.

Thus, it is an object of this invention to prepare polymeric materials which have pendant groups, such as acrylate groups, which are subject to ultraviolet curing.

It is another object of this invention to prepare highly acrylated polymeric coatings.

It is a further object of this invention to prepare acrylated coating compositions by a process wherein the catalyst utilized to catalyze the reaction between the polymer and the acrylate monomer, is recoverable during the course of the reaction.

These and other objects are obtained by carrying out the instant invention.

SUMMARY OF INVENTION

Basically, this invention involves a co-reaction between a polymer having a pendant group of the formula

with a monomeric material having a formula

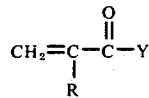

wherein X is OH or COOH, and Y is OH when X is OH, or OR'OH when X is COOH, wherein R is hydrogen or methyl, and R' is $C_1$–$C_6$ alkyl. The reaction is catalyzed utilizing an essentially solid ion exchange resin catalyst. After the reaction is completed, the ion exchange resin is removed generally by filtration.

DESCRIPTION OF THE INVENTION

The polymers which are useful in the instant invention are of two types -- pendant, aliphatic, hydroxy-containing, or pendant carboxy-containing. In either event, the polymers should have a number average molecular weight of less than about 10,000, preferably about 300 to about 5,000. Furthermore, the polymers should contain at least about two carboxy or hydroxy group, or mixtures thereof, per molecule, preferably about three or four carboxy or hydroxy groups per molecule. It is, in addition, preferred that the hydroxy groups be primary or secondary in nature, although tertiary hydroxy groups may also be employed.

Examples of the types of polymers which may furnish such aliphatic hydroxyl groups include polymers prepared from alpha beta ethylenically unsaturated monomers containing an alpha beta ethylencially unsaturated, aliphatic, hydroxycontaining monomer, with the remainder of the polymer being formed of vinyl monomers copolymerizable therewith. Examples of the monomers include allyl and methallyl alcohol, hydroxy alkyl esters of polymerizable acids, including the beta hydroxy alkyl esters of acrylic acid, methacrylic acid, crotonic acid, itaconic acid, and the like. The preferred hydroxy alkyl esters are those which contain 2 to 4 carbom atoms in the alkyl group. Examples of these esters are beta hydroxy ethyl acrylate, beta hydroxy ethyl methacrylate, beta hydroxy propylacrylate, beta hydroxy propyl methacrylate, beta hydroxy butyl crotonate, beta hydroxy propyl maleate, beta hydroxy ethyl fumarate, and the like. Beta hydroxy alkyl esters can generally be prepared by reacting a monoepoxide-containing compound with a polymerizable, alpha beta ethylenically unsaturated acid. Examples of such monoepoxides are ethylene oxide, 1,2-propylene oxide, 1,2-butylene oxide, 2,3-butylene oxide, styrene oxide, phenyl glycidyl ether, butyl glycidyl ether, and the like. Most preferred of the hydroxyl-containing monomers are beta hydroxy ethyl acrylate and beta hydroxy propyl acrylate.

In addition to the hydroxy monomer, other types of ethylenically unsaturated monomers which are copolymerizable therwith may be employed. Examples of these monomers include styrene, vinyl toluene, vinyl acetate, vinyl propionate, vinyl butyrate, vinyl laurate, vinyl oleate, vinyl stearate, and the other vinyl esters of fatty acids having from 1 to 18 carbon atoms, as well as the polymerizable acids themselves.

Acrylonitrile, methacrylonitrile, acrylamide, methacrylamide, methylstyrene, allyl acetate, glycidyl methacrylate, t-butylaminoethylmethacrylate, vinyl pyrrolidone, N,N-dimethylaminoethylmethacrylate, ethylene, propylene, vinyl chloride, vinyl fluouride, vinylidene fluoride, hexafluoropropylene, chlorotrifluoroethylene, and tetrafluoroethylene can also be used as the monomers herein.

Generally, the hydroxy monomers should be added on a weight basis, so that they comprise about 10 to about 90 percent, by weight, of the monomers utilized, preferably about 30 to about 70 percent.

A preferred type of hydroxy-containing copolymer is prepared by copolymerizing styrene and allyl or methallyl alcohol in the range of about 70 to 95 percent, by weight, styrene, the remainder being allyl alcohol, or methallyl alcohol.

Generally any of the varied methods of vinyl polymerization can be utilized in preparing the hydroxy-containing polymers of the instant invention. Preferably, the various polymerization initiators are utilized to effect polymerization. Examples of such initiators include organic peroxides, such as tertiary butyl hydroperoxide, ditertiary butyl peroxide, cumene hydroperoxide, dicumyl peroxide, benzoyl peroxide, and the like. Equally suitable are organic peroxygen compounds, such as tertiary butyl peroxide acetate, tertiary butyl perbenzoate, ditertiary butyl diperthalate and the like. Other initiators include azodiisobutyronitrile (AIBN), ultraviolet light, gamma radiation, etc.

The polymers of the instant invention may be prepared by a bulk polymerization process or by adding the above-described monomers to the reaction medium over a period ranging from 30 minutes to 10 to 12 hours. The polymerization initiator may be added to the reaction flask or may be mixed with the monomer, or separately added, depending upon desired final product. Reaction temperatures may vary from 70 to 80° C. up to about 180 to 220° C. or higher, again depending upon the various desired end products and the monomers utilized.

The vinyl hydroxy polymers of the instant invention may be prepared in virtually any solvent in which the final polymer is soluble and which is not interferingly reactive with either the final product, the initiators or the monomers utilized. Examples of the solvents which may be utilized include, but are not limited to, the various alcohols, ester alcohols, esters, and the like. In addition, minor amounts of petroleum-based solvents, such as mineral spirits, naphthas, and the like, may be utilized, as well as other solvents, such as xylene, toluene, benzene, and the like.

Where alcohol or ester-containing solvents are utilized, these solvents must be removed prior to the esterification reaction herein.

As previously described, carboxylic acid-containing monomers which have previously been set out, may be utilized either alone or in combination with the hydroxy-containing monomers previously set out. Where no hydroxy-containing monomer is employed, the carboxy-containing monomer should be utilized in an amount equal to about 10 to about 60 percent, by weight, based upon the total copolymer composition, preferably about 10 to about 30 percent. The carboxylic acid groups may be furnished by carboxylic acids, such as acrylic acid, methacrylic acid, crotonic acid, itanoic acid, and half-acid esters of maleic and fumaric acids, to name but a few.

Instead of utilizing the vinyl hydroxy-containing or carboxy-containing polymers described above, so-called alkyd resins may be utilized, as long as the previously set out requirements on the number of hydroxy or carboxy groups per molecule are met. Generally, in meeting these requirements, the alkyd resin will have an acid value in the range of about 2 to about 50, preferably about 6 to 15, or an hydroxy value of about 20 to about 250, preferably about 60 to about 150, or both.

The methods for preparing these resins are well known in the art. In general, two basic methods are used. In the first a fatty acid reacted with a mixture of polyols and polybasic acids, such as glycerine and phthalic anhydride. The second method commonly used entails the alcoholysis of a fatty oil, such as coconut oil, with the polyol, such as pentaerythritol, and the further condensation of this reaction product with polyols and polybasic acids as above.

The alkyd resins useful in this invention are those containing from about 5 to about 80 weight percent of a fatty acid or oil. Alkyd resins having less than about 5 percent fatty compound are commonly classified as the "oil-less" alkyd resins or polyester resins and are described hereiafter.

Included among the various fatty acids and oils useful in preparing these alkyd resins are the fatty acids derived from the following oils: castor, dehydrated castor, hydrogenated castor, coconut, corn, cottonseed, linseed, oticica, perilla, poppyseed, safflower, soybean, tung oil, etc., and the various rosins contain tall oil fatty acids. Useful polyols include the various glycols, such as ethylene glycol, propylene glycol, neopentyl glycol, butylene glycol, 1,4-butanediol, hexylene glycol, 1,6 hexanediol, the polyglycols, such as diethylene glycol or triethylene glycol, etc.; the triols such as glycerine, trimethylol ethane, trimethylol propane, etc., and other higher functional alcohols such as pentaerythritol, sorbitol, mannitol, and the like. Acids useful in preparing the alkyd resins of this invention include monofunctional acids, such as rosin acids, benzoic acid, paratertiary butyl benzoic acid and the like; the polyfunctional acids, such as adipic acid, azelaic acid, sebacic acid, phthalic acid or anhydride, isophthalic acid, tetrephthalic acid dimerized and polymerized fatty acids, trimellitic acid, and the like.

The preferred alkyd resins are prepared by reacting a thiol, such as trimethylol propane with aliphatic dibasic acids, such as adipic acid, and an aromatic dibasic acid, such as phthalic anhydride, in the presence of a fatty acid, such as hydrogenated castor oil fatty acid. The preferred molar ratios of triol to aliphatic di-acids to armatic di-acids to fatty acids are in the ranges of 1.5:2.5 to 7:10 to 0.5:1.5 to 0.25:1. The preferred reactants are selected from trimethylolpropane, adipic acid, phthalic anhydride or isophthalic acid, and hydrogenated castor oil faty acid.

In order to prepare materials having pendant carboxy groups, an excess of carboxylic acid equivalents over hydroxy equivalents is employed.

The only difference between the alkyd resins and the so-called "oil-less" alkyds or polyester resins is that the "oil-less" alkyds contain little or no fatty acid-containing materials. Other than this, the previously mentioned requirements for acid number, hydroxyl number and other requirements of the alkyd resins are equally applicable to the "oil-less" polyester resins.

A particularly preferred polyester resin is prepared by reacting a long-chain glycol, a glycol, isophthalic acid, an aromatic dicarboxylic acid and an aliphatic dicarboxylic acid in molar ratios of about 1 mole of long-chain gylcol, two moles of glycol, one mole of aromatic di-acid, and one mole of aliphatic diacid.

Preferred long-chain glycols include the polyalkylene glycols, such as triethylene glycol; short-chain glycols include ethylene glycol and 1,3 butylene glycol. The aromatic di-carboxylic acids include phthalic or isophthalic acids; while the aliphatic di-acids include azelaic, adipic and sebasic acids.

Other types of polymeric materials which may be utilized to furnish either the carboxyl or hydroxy-containing polymer useful are the so-called epoxy resins and more particularly, the epoxy resins esters. The epoxy resins are basically polyglycidyl ethers of polyhydric phenols obtained by reacting a polyhydric phenol in excess epihalohydrin with sodium hydroxide. Examples of the polyhydride phenols include bisphenol A (p,p'-dihydroxy diphenylpropane), resorcinol, hydroquinone, 4,4'-dihydroxy benzophenone, bis(4-hydroxyphenyl)ethane, 1-5 dihydroxy napthalene, 4,4'-dihydroxybiphenyl, and the like.

Other glycidyl ethers of polyhydric phenols are polymers prepared by reacting 1.1 up to about 2 moles of epichlorohydrin with 1 mole of dihydric phenol or by reacting polyepoxides with added polyhydric phenol.

Additional epoxide resins are glycidyl ethers of polyhydric alcohols, prepared by reacting a polyhydric alchol in epichlorohydrin with an acid catalyst, such as boron trifluoride, and subsequently reacting the resulting product with an alkaline dehydrohalogenating agent. Included among the polyhydric alcohols which can be used in the preparation of these polyepoxides are ethylene glycol, pentaerythritol, propylene glycol, diethylene glycol, hexanediol, trimethylol ethane, trimethylol propane, and the like.

The polyepoxides after they have been prepared as described above are then reacted with either a carboxylic acid, an alcohol, or added monohydric phenol, in order to completely react all of the free epoxide groups. Where acid-functional materials are desired, any of the previously described polycarboxylic acids may be reacted with the polyepoxide to yield an acid-functional material having an acid value and molecular weight as previously described. Instead of utilizing a carboxylic acid for reaction with the polyepoxide, a polyfunctional alcohol may be reacted with the polyepoxide in the same manner as preparing a hydroxy-containing material. In addition, however, monocarboxylic acids or mono-alcohols may be reacted with the polyepoxide to produce materials having pendant hydroxy groups. Thus, for example, so-called epoxy ester materials may be utilized, where, for example, a fatty acid has been reacted with polyepoxide yielding at least about two pendant hydroxy groups per molecule.

Yet another type of polymer useful herein is prepared by reacting an epoxide-containing monomer as described above, e.g., propylene oxide or ethylene oxide, with a polyol containing at least three hydroxyl groups per molecule. Examples of said polyols include glycerine, pentaerythritol, the polymers of pentaerythritol, trimethylolpropane, trimethylolethane, and the like.

Another method of obtaining carboxylic acid-containing polymers, is by reacting an hydroxy-containing polymer with a carboxylic acid anhydride, such as phthalic anhydride, trimellitic anhydride, succinic anhydride, and the like. Thus, the anhydride is simply mixed into the desired polymer and the polymer heated to just above the melting point of the anhydride. The anhydride ring is then opened by co-reaction between the pendant hydroxy groups and the anhydride, and there results a half-ester reaction, producing a polymer having pendant carboxylic acid groups.

As previously stated a polymer of the moiety C-X is reacted with a monomer of the formula

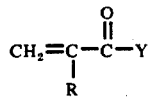

wherein X is OH when Y is OH, and X is COOH when Y is R'OH, wherein R is hydrogen or methyl, and R' is $C_1$-$C_6$ alkyl.

Thus, where pendant hydroxy-containing polymers are utilized, acrylic or methacrylic acids are employed, and where pendant carboxy-containing materials are utilized, hydroxy alkyl esters of acrylic or methacrylic acids are employed. In any event, at least two and preferably three of the acrylate or methacrylate monomers are reacted onto each polymer molecule.

This reaction is catalyzed by the use of an essentially solid, ion exchange resin as further described in Kirk-Othmer *Encyclopedia of Chemical Technology*, 2nd Ed., Vol. II. The term "essentially solid" means a material which is crushable or pulverizable, and is non-sintering in that form. The ion exchange resin must further be insoluble in the reaction medium, must be of the acidic cationic exchange type, and must comprise a polymer matrix onto which has been grafted sulfonic or phosphoric acid groups. In most instances, a predominantly aromatic polymer is formed utilizing vinyl aromatic monomers, such as styrene or vinyl toluene, and a polyfunctional monomer, such as, for example, divinyl benzene. The resulting polymer is then sulfonated or phosphorated to product pendant phosphoric acid or sulfonic acid groups, as the case may be. Preferably, the ion exchange resins of the instant invention are prepared by sulfonating an aromatic vinyl polymer or copolymer with a sulfonating agent selected from sulfuric acid, chlorosulfonic acid or sulfur trioxide.

The preferred ion exchange resins have hydrogen ion concentrations from their sulfonic or phosphoric acid groups in the range of about one to about 10 milliequivalents by hydrogen ion per gram of dry materal. An alternate method for preparing these ion exchange resins is by homo- or co-polymerizing with other monomers a material such as styrene sulfonic acid.

Preferably, the ion exchange resin is utilized in its bead form, i.e., as particulate spheres having a majority of particles which will pass through at least 16-20 mesh U.S. Standard Screens, preferably 20-30 mesh.

Crushed or pulverized versions of the resin may also be included.

In order to prepare the novel products of this invention, the co-reactants, i.e., the polymer and the carboxy or hydroxy-containing monomer, are mixed in a reaction flask along with the desired ion exchange resin. Generally, the ion exchange resin is added to the five to fifty percent level, by weight, based upon the total weight of the ion exchange resin and the polymer to be reacted. Preferably, the ion exchange resin is added to the weight range of about 10 to about 30 percent.

In order to remove the water of the reaction, an azeotrope solvent is employed. Generally, azeotrope solents are hydrocarbons having boiling points in the range of about 60° to about 150° C., with the preferred solvents being benzene, toluene, and the various hydrocarbon fractions having boiling points in the indicated range.

Also added to the reaction mixture is a polymerization inhibitor to insure that copolymerization of the alpha beta ethylenically unsaturated vinyl polymerizable monomer does not occur during esterification. Examples of such materials include the quinones, such as hydroquinone, the various phenols, p-tert-butylcatechol, p-methoxyphenol, 2,4-dichloro-6-nitrophenol, n-propyl gallate, di-tert-butyl-p-cresol, 2,2'-methylene bis(4-methyl-6-tert-butylphenol), 1-amino-7-napthol, p-benzoquinone, 2,6-dichloro-p-benzoquinone, 2-amino-1,4-napthoquinone, 3-aminoanthraquinone, diphenylamine, p-nitrosodiumethylaniline, $\alpha$ and $\beta$-napthylamine, phenothiazine, N-nitrosodimethylamine, hexamethylphosphoramide, n-dodecyl mercaptan, benzenethiol, 2,2-diphenyl-1-picrylhydrazyl (phenyl hydrazine), divinylacetylene, and various antimony and copper salts. The inhibitors should be added to the reaction mixture in the range of about 50–1000 parts per million parts by weight of reactant, preferably about 100–400 ppm.

The reaction is carried out at temperatures ranging from about 50°–150° C. for a time sufficient to carry out essentially complete esterification between the reactants, as generally measured by a decrease in acid valve. In any event, the minimum reaction temperature and reaction period should be employed, in order to assure that excessive vinyl homopolymerizaton does not occur.

During the reaction and the subsequent vacuum strip of the azeotrope solvent, a steady stream of oxygen-containing nitrogen, i.e., nitrogen containing about 2–25 percent, by volume, of oxygen, should be sparged into the reactor in order to keep the inhibitor active.

After the desired extent of reaction is obtained, the vacuum is applied to the reactor and the temperature allowed to increase to about 150° C., in order to remove the azeotrope solvent. The reaction medium is then filtered and the ion exchange resin removed for repeated use.

The ion exchange may be utilized several times without reduction in its properties and may be regenerated by reaction with added strong acid.

The pendant vinyl group containing polymer as prepared above, may be compounded into ultraviolet curable coating compositions as described hereafter.

Generally, the ultraviolet curable compositions of the instant invention contain from about 40 to about 100 percent, by weight, based on the total curable composition, of an alpha beta ethylenically unsaturated vinyl polymerizable compound containing at least two vinyl polymerizable groups per molecule. Included are unsaturated esters of polyols and particuulary such esters of the alpha methylene carboxylic acids, e.g., ethylene diacrylate, diethylene glycol diacrylate, glycerol diacrylate, glycerol triacrylate, ethylene dimethacrylate, 1,3-propanediol dimethacrylate, 1,2,4-butanetriol trimethacrylate, 1,4-cyclohexanediol diacrylate, 1,4-benzenediol dimethacrylate, pentaerythritol tri- and tetra-acrylate and methacrylate, trimethylolpropane triacrylate, trimethylolethane triacrylate, dipentaerythritol hexacrylate, tripentaerythritol octaacrylate, sorbitol hexacrylate, 1,3-propanediol diacrylate, 1,5-pentanediol dimethacrylate, hexanediol diacrylates, the bis-acrylates and methacrylates of polyethylene glycols of a molecular weight of 200–1500, and the like; unsaturated amides, particulary those of the alpha methylene carboxylic acids, especially those of alpha, omega-diamines and oxygen-interrupted omega-diamines, such as methylene bis-acrylamide, methylene bis-methacrylamide, ethylene bis-methacrylamide, 1,6-hexamethylene bis-acrylamide, diethylene triamine tris-methacrylamide, bis(gammamethacrylamidopropoxy)ethane, beta-methacrylamidoethyl methacrylate, N-beta-hydroxy-ethyl-beta-(methacrylamido) ethyl acrylate, and, N,N-bis(beta-methacryloxyethyl) acrylamide; vinyl esters such as divinyl succinate, divinyl adipate, divinyl phthalate, divinyl terephthalate, divinyl benzene-1,3-disulfonate, and divinyl butane, 1,4-disulfonate; styrene and derivatives thereof and unsaturated aldehydes, such as sorbaldehyde (hexadienal). An outstanding class of these preferred addition polymerizable components are the esters and amides of alpha-methylene carboxylic acids and substituted carboxylic acids with polyols and polyamides wherein the molecular chain between the hydroxyl and amino groups is solely carbon or oxygen-interrupted carbon.

The polyethylenic unsaturation-containing polymer, as prepared by the instant invention, can be present in an amount from about 40 to about 100 percent, by weight, based on the total curable composition. In other words, it may be the only ethylenically unsaturated vinyl polymerizable compound present containing at least two vinyl polymerizable groups per molecule, or it may be used in combination with other such materials. Other types of polymers containing ethylenic unsaturation which may be utilized herein include polymers containing maleic and fumaric acids or esters, as well as polymeric unsaturated materials prepared by reacting vinyl hydroxy or carboxy materials with polyepoxides, e.g., acrylic acid with the diglycidyl ether of bisphenol A. Also included are polymers such as polyvinyl acetate/acrylate, cellulose acetate/acrylate, cellulose acetate/methacrylate, N-acryloxymethylpolyamide, N-methacryloxymethylpolyamide, allyloxymethylpolyamide, etc.

In addition to the aforementioned polyfunctional polymerizable compounds, compounds containing a single polymerizable ethylenically unsaturated group of the structure

can also be utilized. In addition to traditional "monomers", as described hereafter, the monounsaturated compounds may be polymeric materials, as previously described, containing on the average a single site of unsaturation on each polymer molecule. These monomers can be aliphatic, aromatic, cycloaliphatic or any variant thereof. Among the monomers are included styrene, 4-methylstyrene, alphamethylstyrene, and the like; acrylic acid and its nitrile, amide and $C_1$–$C_{12}$ alkyl, aryl, or hydroxy alkyl derivatives, such as acrylonitrile, ethylacrylate, 2-ethylhexyl acrylate, butoxyethoxyethyl acrylate, hydroxyethyl acrylate, as well as others; the vinyl halides, such as vinyl chloride, vinylidene chloride, and the like; vinyl ketones such as vinyl phenyl ketone, vinyl methyl ketone, alpha-chlorovinyl methyl ketone, and the like; the vinyl thioethers such as vinyl ethyl sulfide, vinyl p-tolylsulfide, divinyl sulfide, and the like. Other monomers include vinyl ether sulfone, vinyl ethyl sulfoxide, vinyl sulfonic acid, sodium vinyl sulfonate, vinyl sulfonamide, vinyl pyridine, N-vinyl pyrrolidone, N-vinyl carbazole, and the like. Generally any alpha beta ethylenically unsaturated monomer which does not interfere with the ultraviolet curing mechanism may be utilized, and as such, these monomers are well known in the art.

These compounds may be added in amounts up to about 60 percent, by weight, based upon the total curable composition, preferably about 10 to about 30 percent.

The instant invention can also contain up to about 60 percent, by weight, based upon the total curable system, of a polymeric material containing no polymerizable unsaturation. Among the polymers are the polyolefins and modified polyolefins, the vinyl polymers, the polyethers, the polyesters, the polylacetones, the polyamides, the polyurethanes, the polyureas, the polysiloxanes, the polysulfides, the polysulfones, the polyformaldehydes, the phenol-formaldehyde polymers, the natural and modified natural polymers, the heterocyclic polymers, and the like.

Illustrative of these polymers are the acrylic polymers such as poly(acrylic acid), poly)methyl acrylate, poly(ethyl acrylate), poly(methacrylic acid), poly(methyl methacrylate), poly(ethyl methacrylate); poly(vinyl chloride); poly(vinyl alcohol); poly(ethylene/propylene/5-ethylidenebicyclo[2.2.1]-hept-2-ene); polyethylene; polypropylene; synthetic rubbers, e.g., butadiene/acrylonitrile copolymers and chloro-2-butadiene 1,3 polymers; the polyesters, copolyesters, polyamides and copolyamides, such as polycaprolacetone, poly(caprolactone/vinyl chloride), poly(ethylene glycol terephthalate), poly(hexamethylene succinate), poly(hexamethylene maleate), poly(hexamethylene carbonate), poly(caprolactam), poly(hexamethylene adipamide), and the like; the polyethers such as poly(glutaraldehyde), polyethylene oxide, polypropylene oxide, poly(tetrahydrofuran), polycyclohexene oxide, copolymers of ethylene oxide and propylene oxide with starters containing reactive hydrogen atoms such as the mixed copolymers using ethylene glycol, glycerol, sucrose, etc., as the starter; vinylidene polymers and copolymers, e.g., vinylidene chloride/acrylonitrile, vinylidene chloride/methacrylate and vinylidene chloride/vinyl acetate polymers; ethylene/vinyl acetate copolymers; the polyureas and polyurethanes, such as described in *Polyurethanes: Chemistry and Technology*, Volumes I and II, Sanders and Frisch, published by Interscience Publishers; the polycarbonates; polystyrenes; polyvinyl acetals, e.g., polyvinyl butyral, polyvinyl formal; the cellulose ethers, e.g., methyl cellulose, ethyl cellulose, and benzyl cellulose; the cellulose esters, e.g., cellulose acetate, cellulose acetate succinate and cellulose acetate butyrate; as well as the natural and modified natural polymers such as gutta percha, cellulose, gelatin, starch, silk, wool, and the like; the siloxane polymers and copolymers; the formaldehyde polymers such as polyformaldehyde; formaldehyde resins such as phenol-formaldehyde, melamine-formaldehyde, urea-formaldehyde, aniline-formaldehyde and acetone-formaldehyde; phenolic resins and the like.

If desired, the photo-polymerizable compounds can also contain immiscible polymeric or non-polymeric organic or inorganic fillers or reinforcing agents, e.g., the organophilic silicas, bentonites, silica, powdered glass, colloidal carbon, as well as various types of dyes and pigments, in varying amounts. The fillers are useful in improving the strength, reducing tack and as coloring agents in the coatings of this invention.

In order to insure that the compositions of the instant invention are curable when exposed to ultraviolet or electromagnetic radiation, a photosensitizer is employed in an amount of from about 0.1 up to about 15 percent, by weight, based on the total curable composition, preferably about one to about five percent, by weight, on the same basis.

These photosensitizers fall into many classes and include compounds such as benzoin derivatives, as disclosed in German Pat. No. F523401VC/396, acetophenone, propiophenone, xanthone, fluorenone, benzaldehyde, fluorene, anthraquinone, triphenylamine, carbazole, 3- or 4-methylacetophenon, 3- or 4-pentylacetophenone, 3- or 4-methoxyacetophenone, 3- or 4-bromoacetophenone, 3- or 4-allylacetophenone, p-diacetylbenzene, 3- or 4-methoxybenzophenone, 3- or 4-methylbenzophenone, 3- or 4-chlorobenzophenone, 4,4'-dimethoxybenzophenone, 4-chloro-4'-benzylbenzophenone, 3-chloroxanthone, 3,9-dichloroxanthone, thioxanthone, and chlorinated thioxanthones, 3-chloro-8-nonylxanthone, 3-methoxyxanthone, 3-iodo-7-methoxyxanthone, and the like.

Also included are the acetophenone photosensitizers of the type described in U.S. Pat. No. 3,715,293, having the structure

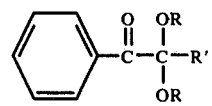

I.

wherein R is alkyl of from 1–8 carbon atoms, or aryl with 6 carbon atoms, and R' is hydrogen, alkyl of from 1–8 carbon atoms, aryl of from 6–14 carbon atoms or cycloalkyl of 5–8 carbon atoms.

The alkylphenone photosensitizers having the formula

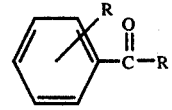

II.

the benzophenone type photosensitizers having the formula

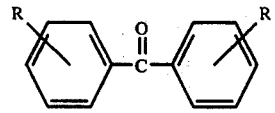

III.

the tricyclic fused ring type having the formula

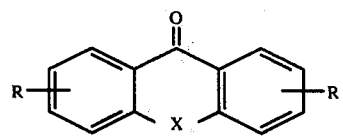

IV.

and the pyridyl type having the formula

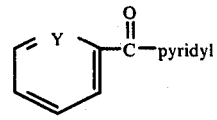

V.

wherein the various substituents are as further described in U.S. Pat. No. 3,759,807, are also included.

Other photosensitizers include 1- and 2-chloroanthraquinone, 2-methylanthraquinone, 2-tertiary butyl anthraquinone, octamethylanthraquinone, 1-4-napthoquinone, 9-10-phenanthrenequinone, 1,2-benzanthraquinone, 2-3-benzanthraquinone, 2-methyl-1,4-naphthoquinone, 2-3-dichloronaphthoquinone, 1-4-dimethylanthraquinone, 2-3-dimethylanthraquinone, 2-phenylanthraquinone, 2-3-diphenylanthraquinone, sodium salts of anthraquinone alpha-sulfonic acid, 3-chloro-2-methylanthraquinone, and the like. Other photoinitiators which are also useful are described in U.S. Pat. No. 2,760,863 and include vicinal ketaldonyl compounds, such as diacetyl benzyl, etc., alpha ketaldonyl alcohols, such as benzoin, pivaloin, etc., acyloin ethers, e.g., benzoin methyl and ethyl ethers, etc., alpha hydrocarbon substituted aromatic acyloins, including alphamethyl benzoin, alpha-allyl benzoin, and alpha phenyl benzoin. Also included are the diacylhalomethanes, corresponding to one of the general formulas:

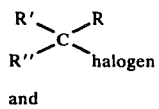

and

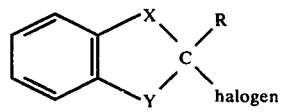

wherein halogen represents a halogen atom such as chlorine or bromine; R represents a hydrogen atom, a chlorine or bromine atom, or an acetyloxy group; R' and R'' (same or different) represent a benzoyl group, a nitrobenzoyl group, a dimethylamino benzoyl group, a phenyl sulfonyl group, a carboxy phenyl sulfonyl group, a methylphenyl sulfonyl group, or a naphthoyl group; and X and Y (same or different) represent a carbonyl group or a sulfonyl group. Included are 2-bromo-1,3-diphenyl-1,3-propane dione; 2,2-dibromo-1,3-indane dione; 2,2-dibromo-1,3-diphenyl-1,3-propane dione; 2-bromo-2-(phenylsulfonyl acetal phenone) and the like, as further described in U.S. Pat. No. 3,615,455.

Other photoinitiators are cataloged by G. Delzenne in *Industrie Cimique Belge*, 24 (1959), 739–764. Most preferred among the added initiators are benzoin and its alkyl ethers, benzophenone and its derivatives, as in Formula III, xanthone, thioxanthones and chlorinated thioxanthones, acetophenone derivatives, as set out in Formula I, and halogenated, aliphatic and aromatic polychlorinated biphenyls and polyphenyls.

Although not required, certain organic amines can be added to the photosensitizers above-described to further enhance the cure rate of the compositions of the instant invention in amounts up to about 500 percent, by weight, of the photosensitizer, preferably up to about 50 percent, by weight. The amines can be primary, secondary, or tertiary, and can be represented by the general formula:

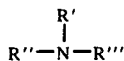

wherein R' and R'' taken singly can be hydrogen, linear or branched alkyl having from 1 to about 12 carbon atoms, linear or branched alkenyl having from 2 to about 12 carbon atoms, cycloalkyl having from 3 to about 10 ring carbon atoms, cycloalkenyl having from 3 to about 10 ring carbon atoms, aryl having from 6 to about 12 ring carbon atoms, alkaryl having 6 to about 12 ring carbon atoms; R''' has the same meaning as R' and R'' with the exception that it cannot be hydrogen and that it cannot be aryl when both R' and R'' are aryl. When taken together R'' and R''' can be a divalent alkylene group $+C_nH_{2n}+$ having from 2 to about 12 carbon atoms, a divalent alkenylene group $+C_nH_{2n-1}+$ having from 3 to about 10 carbon atoms, a divalent alkadienylene group $+C_nH_{2n-2}+$ having from 5 to about 10 carbon atoms, a divalent alkatrienylene group $+C_nH_{2n-3}+$ having from 5 to about 10 carbon atoms, a divalent alkyleneoxyalkylene group $+C_xH_{2x}OC_xH_{2x}+$ having the total of from 4 to about 12 carbon atoms, or a divalent alkyleneaminoalkylene group

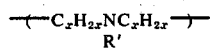

having a total of from 4 to about 12 carbon atoms. As previously indicated, the amines can be substituted with other groups; thus, the R', R'' and R''' variables, whether taken singly or together, can contain one or more substituents thereon. The nature of such substituents is generally not of significant importance and any substituent group can be present that does not exert a pronounced deterrent effect on the ultraviolet crosslinking reaction.

Illustrative of suitable organic amines one can mention are methylamine, dimethylamine, trimethylamine, diethylamine, triethylamine, propylamine, isopropylamine, diisopropylamine, triisopropylamine, butylamine, tributylamine, t-butylamine, 2-methylbutylamine, N-methyl-N-butylamine, di-2-methylbutylamine, trihexylamine, tri-2-ethylhexylamine, dodecylamine, tridodecylamine, tri-2-chloroethylamine, di-2-bromoethylamine, methanolamine, ethanolamine, diethanolamine, triethanolamine, methyldiethanolamine, dimethylethanolamine, isopropanolamine, propanolamine, diisopropanolamine, triisopropanolamine, butylethanolamine, dihexanolamine, 2-methoxyethylamine, di-2-ethylhexylamine, tri-2-ethoxyethylamine, 2-hydroxyethyldiisopropylamine, 2-aminoethylethanolamine, allylamine, butenylamine, dihexadienylamine, cyclohexylamine, tricyclohexylamine, trimethylcyclohexylamine, bis-methylcyclopentylamine, tricyclohexenylamine, tricyclohexadienylamine, tricyclopentadienylamine, N-methyl-N-cyclohexylamine, N-2-ethylhexyl-N-cyclohexylamine, diphenylamine, phenyldimethylamine, methylphenylamine, ditolylamine, trixylyl-amine, tribenzylamine, triphenethylamine, benzyldimethylamine, benzyldihexylamine, trischlorophenethylenimine, N-methylethylenimine, N-cyclohexylethylenimine, piperidine, N-ethylpiperidine, 2-methylpiperidine, 1,2,3,4-tetrahydropyridine, 1,2-dihydropyridine, 2-, 3- and 4-picoline, morpholine, N-methyl morpholine, N-2-hydroxyethylmorpholine, N-2-ethoxyethylmorpholine, piperazine, N-methylpiperazine, N,N''-dimethylpiperazine, 2,2-dimethyl-1,3-bis[3(N-morpholinyl)-propionyloxy]propane, 1,5-bis[3-(N-morpholinyl)-propionyloxy]diethyl ether, and the like. The preferred organic amines are the tertiary amines, with the alkanol amines being most preferred. The specific preferred amine activators are triethanolamine, morpholine and methyldiethanolamine.

The compositions of the instant invention after being prepared in the ratios as set out above can be applied to the material to be coated by conventional means, including brushing, spraying, dipping, curtain and roll coating techniques, and may, if desired, be dried under ambient or oven conditions to provide coating films on the substrate. The substrate can be of any composition, e.g., wood, metal, paper, plastic, fabric, fiber, ceramic, concrete, plaster, glass, etc.

Typically a mixture of the compositions described above in combination with the photoinitiators and, where utilized, the amine activator, is prepared and the composition applied to the desired wood substrate. It is then exposed to electromagnetic radiation having wave lengths of above about 2000 Angstrom units, preferably from about 2000 up to about 5000 Angstroms. Exposure should be from a source located about 1 to 5 inches from the coating for a time sufficient to cause crosslinking of the composition and can range from about 0.1 seconds up to about 1 min./linear ft. Generally the light radiation will have power of about 200 watts per linear inch.

The light radiation can be ultraviolet light generated from low, medium and high pressure mercury lamps. This equipment is readily available and its use is well known to those skilled in the art of radiation chemistry. Other sources include electron beam radiation, plasma arc, laser beams, etc.

The compositions of the instant invention produce coatings which, when cured, are less prone to yellow upon exposure to light, and have good gloss and adhesion properties. The coatings are particularly useful in metal decorating applications.

In the following examples all parts and percentages are by weight unless otherwise indicated.

EXAMPLE 1

Into a reactor equipped with a thermometer, heating mantle, water condenser and takeoff arm, were added 525 parts of triethylene glycol, 217 parts of ethylene glycol, 315 parts of 1,3-butylene glycol, 616 parts of isophthalic acid, 515 parts of adipic acid and 1.5 parts of dibutyl tin oxide esterification catalyst. The contents of the flask were heated over a one-hour period to 130°–150° C., at which time water removal was begun. Over the next ten hours, the temperature of the reaction mixture was allowed to increase to about 240° C. Reaction was continued until the acid value was reduced to about 10.

EXAMPLE 2

1800 parts of the polyester prepared in Example 1 and 2900 parts of benzene were placed in a reactor, as described in Example 1, heated to 80°–85° C., and held at this temperature under reflux for about one hour to remove any water. 421.7 parts of acrylic acid, 0.4 parts of methylether of hydroquinone, 0.1 parts of phenothiazine, and 485 parts of Amberlist 15 ion exchange resin, available from the Rohm and Haas Corporation, were then added to the reactor. Amberlist 15 is a styrene divinyl benzene copolymer which has been sulfonated to produce pendant sulfonic acid groups on the polymer, is in bead form wherein about half of the beads pass through 20–30 mesh U.S. Standard screens with the maximum mesh size being about 50 mesh, and has a bulk density of 595 grams per liter, a solids content of 90.5%, by weight, a hydrogen ion concentration of 4.9 milli-equivalents per gram, a surface area of 40–50 sq. meters per gram, and an average pore diameter of 200–600 Angstroms.

The reactor was steadily sparged with a stream of 90% by volume nitrogen and 10% oxygen. The contents were refluxed at 90° C. for a ten-hour period. A product resulted having an acid number of 35.7 and a viscosity of 5400 cps. Solvent was removed by 2 mm/Hg vacuum application maintaining the nitrogen/oxygen sparge at a temperature of about 70° C. over about 2 hours.

EXAMPLE 3

An alkyd resin was prepared, utilizing the reaction equipment as set out in Example 1, by mixing 150 parts of triethylene glycol, 268 parts of trimethylol propane, 299 parts of hydrogenated castor oil fatty acid, 146 parts of adipic acid, and 148 parts of phthalic anhydride. The materials were charged into the reactor, along with 1.3 parts of dibutyl tin oxide and heated to 147° C., at which time the first water of reaction was removed. The contents were gradually heated over about 7 hours to a temperature of 235° C., at which time 101 parts of water had been removed and the acid value was 1.47, the hydroxyl number 206.46 and the viscosity 39,200 centipoise. 500 parts of this material were mixed in a similar reactor with 800 parts of benzene, 90 parts of the Amberlyst catalyst described in Example 1, 110 parts of acrylic acid, 0.116 parts of methylether of hydroquinone, and 0.029 parts of phenothiazene. The contents were heated to about 80° C. and held at this temperature for 15.5 hours under a 90/10 by volume nitrogen/oxygen sparge. The reaction solvent was stripped over two hours with a 2 mm/Hg vacuum at 70° C. maintaining the nitrogen/oxygen sparge, resulting in a product having an acid value of 21.5 and a viscosity of 3600 cps.

The products prepared in Examples 2 and 3 were found to be satisfactory for use as reactive constituents in ultraviolet curable coatings and films.

EXAMPLE 4

The following were charged into a reactor equipped with a mechanical agitator, water-cooled reflux condenser and thermometer: 200 parts of methylmethacrylate, 200 parts ethyl acrylate, 104 parts of hydroxyethyl acrylate, 21 parts of benzoyl peroxide, and 790 parts of toluene. The material was heated to 108° C. and held at this temperature for about eight hours, at which time polymerization was complete.

300 parts of this material were blended with 6 parts of methane sulfonic acid, 200 additional parts of toluene, 16 parts of acrylic acid, and 0.02 parts of methylether of hydroquinone. The blend was heated to 110° C. over a 4-hour period, and the water of esterification was removed azeotropically. It was impossible to separate the methane sulfonic from the polymer by either caustic washing or by crystallization. Therefore, the product was deemed unsuitable for use.

EXAMPLE 5

Over about a 15.5 hour period, the following materials were heated to about 220° C. and held until the theoretical acid value was obtained: 125 parts isophthalic acid, 385 parts adipic acid, 217 parts trimellitic anhydride, 445 parts 1,6-hexanediol, and 152 parts of trimethylolpropane.

500 parts of this material were blended in a reactor with 112 parts of 2-hydroxyethyl acrylate, 60 parts of Amerlyst 15 catalyst, 900 parts of benzene, and 0.44 parts of methylether of hydroquinone. The mixture was heated to 80° C. and held for 20 hours, while a mixture of 90% nitrogen and 10% oxygen was bubbled in. After completion, the ion exchange resin was removed and benzene was stripped off under vacuum without the nitrogen-oxygen sparge. The solution gelled after approximately 80% of the benzene had been removed.

As can be seen from Examples 4 and 5, when either the nitrogen/oxygen sparge is not utilized, or when a catalyst other than the essentially solid ion exchange is employed, unsatisfactory products result.

What is claimed is:

1. A process for preparing an ultraviolet curable polymer having pendant acrylate or methacrylate groups which comprises co-reacting in the presence of a vinyl polymerization inhibitor and a nitrogen-oxygen sparge a polymer containing at least about two C-X moieties and having a number average molecular weight of less than about 10,000, with a monomer having the general formula

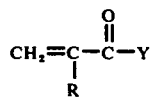

wherein X is OH or COOH, R is hydrogen or methyl, and Y is OH when X is OH, and OR'OH when X is COOH, wherein R' is $C_1$-$C_6$ alkyl, utilizing as the reaction catalyst a reaction medium insoluble, essentially solid, acidic cationic exchange resin.

2. The process of claim 1 wherein the starting polymer has a molecular weight of less than about 10,000 and contains at least about two hydroxy groups per molecule.

3. The process of claim 1 wherein the reaction is carried out at a temperature of from about 50°–150° C.

4. The process of claim 1, wherein the ion exchange resin is utilized in bead form, wherein a majority of said beads will pass through at least 16–20 mesh U.S. Standard Screens.

5. The process of claim 1, wherein said reaction is carried out in the presence of a hydrocarbon azeotrope solvent having a boiling point in the range of about 60°–150° C.

6. The process of claim 1, wherein the reaction is carried out in the presence of a polymerization inhibitor at about the 50–1000 parts per million of reactant level.

7. The process of claim 1, wherein the nitrogen-containing oxygen sparge contains from about 2 to about 25 percent, by volume, of oxygen.

8. The process of claim 1, wherein the polymer is hydroxy-containing, and is prepared by copolymerizing styrene and allyl or methallyl alcohol.

9. The process of claim 1, wherein the polymer is prepared by copolymerizing alpha beta ethylenically unsaturated vinyl polymerizable monomers containing hydroxy or carboxy groups or mixtures thereof.

10. The process of claim 1, wherein the polymer is prepared by reacting a fatty acid with a mixture of polyols and polybasic acids.

11. The process of claim 1, wherein the polymer is prepared by the alcoholysis of a fatty oil and the further condensation of this product with polyols and polybasic acids.

12. The process of claim 1, wherein the polymer is prepared by reacting a long-chained glycol, an aromatic dicarboxylic acid and an aliphatic dicarboxylic acid.

13. The process of claim 1, wherein the polymeric material is an epoxy resin ester.

* * * * *